_United States Patent_ [19]

Tsai et al.

[11] Patent Number: 5,001,217

[45] Date of Patent: Mar. 19, 1991

[54] CROSSLINKABLE RIGID-ROD BENZOBISAZOLE POLYMERS

[75] Inventors: Tsu-Tzu Tsai, Dayton; Fred E. Arnold, Centerville, both of Ohio

[73] Assignee: The United States of America as represented by the Secretary of the Air Force, Washington, D.C.

[21] Appl. No.: 379,039

[22] Filed: Jul. 13, 1989

[51] Int. Cl.[5] .............................................. C08G 75/32
[52] U.S. Cl. .................................... 528/337; 528/183; 528/186; 528/342; 528/348; 528/349
[58] Field of Search ................ 528/337, 342, 348, 349

[56] References Cited

U.S. PATENT DOCUMENTS

| | | | |
|---|---|---|---|
| 4,108,835 | 8/1978 | Arnold et al. | 528/183 |
| 4,207,407 | 6/1980 | Helminiak et al. | 525/425 |
| 4,225,700 | 9/1980 | Wolfe et al. | 528/337 |
| 4,377,546 | 3/1983 | Helminiak et al. | 264/232 |
| 4,533,692 | 8/1985 | Wolfe et al. | 524/417 |
| 4,533,693 | 8/1985 | Wolfe et al. | 524/417 |
| 4,554,119 | 11/1985 | Chenevey | 264/85 |
| 4,606,875 | 8/1986 | Chenevey et al. | 264/85 |
| 4,608,427 | 8/1986 | Sweeny et al. | 528/179 |

OTHER PUBLICATIONS

Tsai, T. T. et al, "Benzobisazole Rigid-Rod Polymers with Pendant Methyl Groups", Polymer Preprints, vol. 29, No. 2, pp. 324–325, 1988.
Chuah, H. H. et al, "Crosslinked Benzobisthiazole Rigid-Rod Copolymers via Labile Methyl Groups", Plastic and Coatings Pmr Sci Proc., Apr. 1989.

_Primary Examiner_—Harold D. Anderson
_Attorney, Agent, or Firm_—Charles E. Bricker; Donald J. Singer

[57] ABSTRACT

There are provided crosslinkable, para-ordered aromatic heterocyclic polymers having repeating groups of the following formula

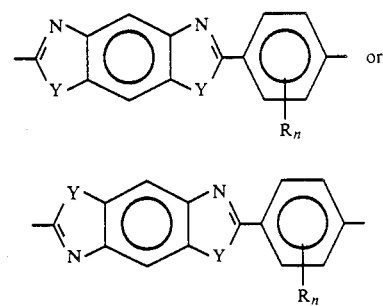

wherein Y is —O—, —S—, or —NH—, n is 1 or 2, and R is an alkyl group having 1 to 4 carbon atoms. In polymers having two pendant R groups, the R groups can be the same or different.

5 Claims, No Drawings

CROSSLINKABLE RIGID-ROD BENZOBISAZOLE POLYMERS

RIGHTS OF THE GOVERNMENT

The invention described herein may be manufactured and used by or for the Government of the United States tor all governmental purposes without the payment of any royalty.

BACKGROUND OF THE INVENTION

This invention relates to crosslinkable, para-ordered aromatic heterocyclic polymers.

In general, the class of aromatic heterocyclic extended chain polymers are well known for their outstanding thermal, physical and chemical properties. These polymers generally exhibit excellent modulus and tenacity properties, but lack good properties when in compression, which limits their use as reinforcing structural fibers.

In Tsai et al, U.S. Pat. No. 4,835,246, dated May 30, 1989, we disclose para-ordered aromatic heterocyclic polymers having pendant benzazole groups. These polymers exhibit improved compressive properties. Further research into para-ordered aromatic heterocyclic polymers has provided polymers which are crosslinkable without degradation of the main polymer backbone.

It is an object of the present invention to provide novel crosslinkable rigid-rod aromatic heterocyclic polymers.

Other objects, aspects and advantages of the present invention will be apparent to those skilled in the art from a reading of the following detailed disclosure of the invention.

SUMMARY OF THE INVENTION

In accordance with the present invention, there are provided para-ordered aromatic heterocyclic polymers having repeating groups of the following formula

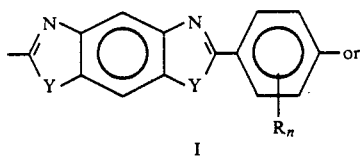

I

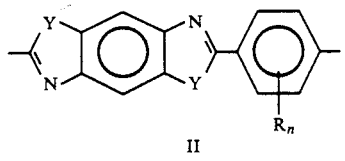

II wherein Y is —O—, —S—, or —NH—, n is 1 or 2, and R is an alkyl group having 1 to 4 carbon atoms. In polymers having two pendant R groups, the R groups can be the same or different.

There are also provided methods for preparing the above polymers as described hereinafter.

DESCRIPTION OF THE PREFERRED EMBODIMENTS

The polymers of the present invention are prepared by reacting an amine monomer having the structure

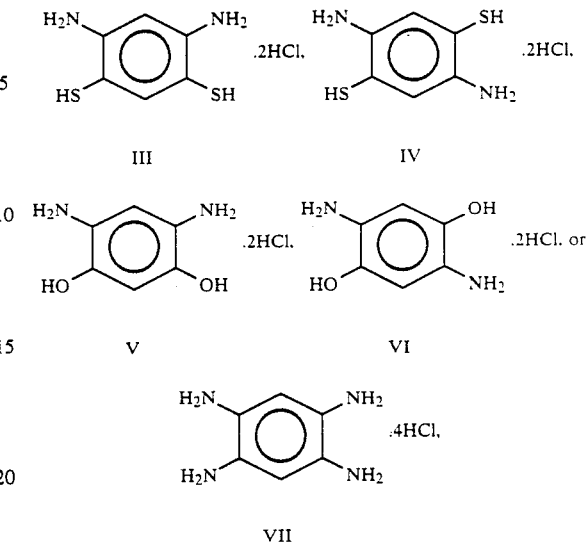

with a mono- or di-alkyl-substituted terephthalic acid, terephthalyl halide or terephthalonitrile. The polymers I or II may be prepared by:

a. mixing an amino monomer (III–VII) with or without oxidation protecting atoms or groups, e.g., HCl groups, with a preliminary solvent of phosphoric acid having a relatively low phosphorous pentoxide content about 63 to 83% preferably below about 80%.

b. heating and optionally placing the resulting mixture under reduced pressure to remove any volatile protecting atoms or groups present and provide a mixture of the amino monomer in the preliminary solvent. This step, as well as subsequent steps, is preferably carried out under an inert gas atmosphere. Suitable inert gases include helium, nitrogen, and argon. Heating the mixture to about 60°–80° C. for about 6 to 24 hours is generally sufficient to remove any volatile products.

c. adding the alkyl-substituted terephthalic acid or acid salt monomer to the mixture resulting from step b to provide a mixture of amino monomer and acid monomer in the preliminary solvent.

d. increasing the phosphorous pentoxide content of the mixture resulting from step c to provide a reaction medium in which the percentage of phosphorous pentoxide should be about 82 to 86% $P_2O_5$, preferably about 82 to 84% at the end of the polymerization.

e. causing polymerization of the monomers at a temperature of about 100° to 200° C. for about 18 to 36 hours. In a presently preferred embodiment, the reaction temperature is increased gradually during the reaction period, e.g., 170° C. for 20 hours, then 190° C. for 4 hours.

The dinitrile and diacid halide monomers tend to sublimate at elevated temperatures; accordingly, it is desireable to maintain the mixture resulting from step d at a relatively lower temperature about 90° C. for about 4 to 16 hours to generate oligomers prior to heating the mixture to the higher polymerization temperatures.

Optionally, steps a, b and c may be combined by adding the amino and terephthalic acid or acid salt monomers to the preliminary phorphoric acid solvent, then removing any volatiles, after which the $P_2O_5$ content is raised and the polymerization is carried out.

At the end of the reaction period, the polymer may be precipitated from solution by pouring the reaction mixture into water. The polymer is treated with a weak base, such as ammonium hydroxide, then purified by washing with water and methanol until all phosphoric acid is removed. The polymer is then dried under reduced pressure.

The polymer may be further purified by dissolving it in methanesulfonic acid, filtering, inversely precipitating with methanol, stirring with concentrated ammmonium hydroxide, and washing with water. The ammonia-free water solution is then filtered and the polymer washed with methanol and methanol-benzene mixtures gradually changing to 100 percent benzene. The swollen polymer is frozen and finally dried under reduced pressure to give a purified polymer having a high molecular weight.

The polymer compositions of this invention are optically anisotropic, i.e. microscopic regions of a given extended chain composition are birefrinqent; a bulk extended chain composition sample depolarizes plane-polarized light because the light transmission properties of the microscopic areas of the extended chain composition vary with direction. This characteristic is associated with the existence of at least part of the extended chain polymer compositions in the liquid crystalline or mesomorphic state.

The extended chain polymer compositions of this invention that exhibit optical anisotropy do so while the extended chain polymer compositions are in the relaxed state. This in in contrast to conventional polymer solutions which may be caused to depolarize plane-polarized light when subjected to appreciable shear.

The polymers of this invention can be crosslinked by exposure to an elevated temperature or by exposure to suitable radiation. Crosslinking by exposure to heat may be accomplished by exposing the material to a temperature of about 300°–550° C. for about 10 to 60 sec. At the higher temperatures, an inert atmosphere of nitrogen, helium or the like, surrounding the material is advised. Radiation crosslinking may be accomplished by exposure of the material to a suitable radiation source, such as gamma radiation, at a radiation level for a time sufficient to provide an irradiation dosage of about 0.1 to 2 GRad.

The polymers of this invention are soluble in strong acids, such as sulfuric acid and methanesulfonic acid. After crosslinking they are completely insoluble in all acid solvents. The liquid crystalline extended chain polymer compositions are extremely suitable for spinning into highly ordered and high strength fibers by spinning them into suitable baths such as by wet and "air gap" spinning techniques, using spinnerets and other apparatus constructed of materials resistant to the strong acids used. In "air gap" spinning, the spinneret is usually located in air or in an inert gaseous medium a short distance, e.g., 1 to 24 cm, above the surface of a coagulating bath. Techniques for fiber spinning are well known in the art. Such fibers are useful as reinforcement substitutes for other inorganic or organic products.

The polymers of this invention may also be employed in any use typically performed by engineering thermoplastic materials, such a metal replacements and those areas where high performance is necessary.

The pendant alkyl terephthalic acid monomers (IX) are prepared as follows:

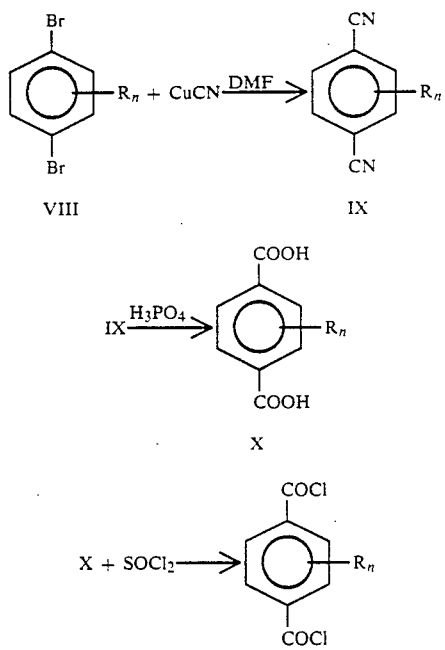

In the reactions given above, R and n are as previously defined.

Conversion of the mono- or di-alkyl-p-dihalo benzene to the corresponding pendant alkyl p-dinitrile, with subsequent conversion to the carboxylic acid or acid halide is known in the art.

Intrinsic viscosity is determined by extrapolation of $\eta(rel) - 1/c$ and $\ln \eta(rel)/c$ to zero concentration in methanesulfonicacid at 30° C.

The following examples illustrate the invention:

EXAMPLE I

Poly(benzo(1,2-d:4,5-d')bisthiazole-2,6-diyl(2-methyl-p-phenylene))

Into the bottom of a resin flask equipped with a high torque mechanical stirrer, nitrogen inlet/outlet, pressure regulator and a side opening for additions, was placed 2.6793 g (11 mmol) ,or 2,5-diamino-1,4-benzenedithiol dihydrochloride, 1,5533 g (11 mmol) of 2,5-biscyanotoluene and 20.40 g of PPA (polyphosphoric acid) (77% $P_2O_5$). The monomers were incorporated into the PPA by stirring, and the resulting mixture was then dehydrochlorinated under reduced pressure (176 mm) by heating as follows: 45° C./18h; 78° C./8h; 80° C./16h. The reaction mixture was cooled to 50° C. and 5.34 g of $P_2O_5$ was added, thereby raising the final polymer concentration to 13%. Under a positive nitrogen flow, the mixture was heated at 90° C. for 16h, at 170° C. for 24h and at 190° C. for 6h. As the temperature was increased, opalescence began to appear at about 160° C. The polymer was precipitated into water, collected by suction filtration, washed with ammonium hydroxide, water, and methanol and then dried under reduced pressure (0.02mm) at 110° C. An intrinsic viscosity of 23.0 dl/g was obtained in methanesulfonic acid.

Calcd for $C_{15}H_8S_2N_2$: C, 65.26: H, 2.87; N, 9.99; S, 22.80

Found: C, 64.61: H, 3.06; N, 9.96; S, 22.08

EXAMPLE II

Poly(benzo(1,2-d:4.5-d')bisthiazole-2.6-diyl(2 5-dimethyl-p-phenylene))

Into the bottom of a resin flask equipped with a high torque mechanical stirrer, nitrogen inlet/outlet, pressure regulator and a side opening for additions, was placed 4.835 g (20 mmol) of 2,5-diamino-1,4-benzenedithiol dihydrochloride and 35.50 g of PPA (77% $P_2O_5$). The monomer was incorporated into the PPA by stirring, and the resulting mixture was then dehydrochlorinated under reduced pressure (176 mm) by heating as follows: 45° C./18h; 78° C./8h; 80° C./16h; and 90° C./4h. At the end of this heating, a clear solution was obtained indicating the completion of dehydrochlorination. The reaction mixture was cooled to 50° C. and 4.5604 g (20 mmol) of 2,5-dimethyl terephthalyl chloride and 16.0 g of $P_2O_5$ were added, with continuous stirring, thereby raising the final polymer concentration to 10%. Under a positive nitrogen flow, the mixture was heated at 80° C. for 16h, at 150° C. for 20h and at 190° C. for 4h. The polymer was precipitated into water, collected by suction filtration, washed with ammonium hydroxide water, and methanol and then dried under reduced pressure (0.02mm) at 110° C. An intrinsic viscosity of 30.8 dl/g was obtained in methanesulfonic acid.

Calcd for $C_{16}H_{10}S_2N_2$: C, 65.28: H, 3.42; N, 9.51; S, 21.78
Found: C, 64.77: H, 3.41; N, 9.38; S, 20.37

EXAMPLE III

Poly(benzo(1,2-d:4,5-d')bisthiazole-2.6-diyl(2.5-dimethyl-p-phenylene))

The procedure of Example II was followed except that 2,5-dicyano-p-xylene was substituted for the 2,5-dimethyl terephthalyl chloride. A polymer having an intrinsic viscosity of 4.61 dl/g was obtained.

EXAMPLE IV

Poly(benzo(1,2-d:4,5-d')bisthiazole-2.6-diyl(2,5-dimethyl-p-phenylene))

The procedure of Example II was followed except that 2,5-dimethylterephthalic acid was substituted for the 2,5-dimethyl terephthalyl chloride. A polymer having an intrinsic viscosity of 13.3 dl/g was obtained.

EXAMPLE V

Poly(benzo(1,2-d:4,5-d')bisoxazole-2,6-diyl(2,5-dimethyl-p-phenylene))

Into the bottom of a resin flask equipped with a high torque mechanical stirrer, nitrogen inlet/outlet, pressure regulator and a side opening for additions, Was placed 4.0585 g (19 mmol) of 4,6-diamino-1,3-benzenediol dihydrochloride, 4.4011 g (19 mmol) of 2,5-dimethylterephthalyl chloride and 30.26 g of PPA (77% $P_2O_5$). The monomers were incorporated into the PPA by stirring, and the resulting mixture was then dehydrochlorinated under reduced pressure (176 mm) by heating as follows: 45° C./18h: 78° C./8h; 80° C./10h; and 90° C./16h. The reaction mixture was cooled to 50° C. and 14.0 g of $P_2O_5$ was added, thereby raising the final polymer concentration to 10%. Under a positive nitrogen flow, the mixture was heated at 130° C. for 16h, at 170° C. for 20h and at 190° C. for 4h. As the temperature was increased, opalescence began to appear at about 160° C. The polymer was precipitated into water, collected by suction filtration, washed with ammonium hydroxide, water, and methanol and then dried under reduced pressure (0.02mm) at 110° C. An intrinsic viscosity of 10.I dl/g was obtained in methanesulfonic acid.

Calcd for $C_{16}H_{10}N_2O_2$: C, 73.28: H, 3.84; N, 10.68
Found: C, 72.65: H, 4.08; N, 10.83

EXAMPLE VI

Poly(benzo(1,2-d:4,5-d')bisimidazole-2,6-diyl(2,5-dimethyl-p-phenylene))

Into the bottom of a resin flask equipped with a high torque mechanical stirrer, nitrogen inlet/outlet, pressure regulator and a side opening for additions, was placed 3.3033 g (11 mmol) of 1,2,4,5-tetraminobenzene tetrahydrochloride, 2.6499 g (11 mmol) or 2,5-dimethylterephthalyl chloride and 14.4 g of PPA (77% $P_2O_5$). The monomers were incorporated into the PPA by stirring and the resulting mixture was then dehydrochlorinated under reduced pressure (176 mm) by heating as follows: 45° C./18h; 78° C./8h; 80° C./16h. The reaction mixture was cooled to 50° C. and 7.0 g of $P_2O_5$ was added, thereby raising the final polymer concentration to 12%. Under a positive nitrogen flow, the mixture was heated at 170° C. for 20h, then at 190° C. for 4h. As the temperature was increased, opalescence began to appear at about 160° C. The polymer was precipitated into water, collected by suction filtration, washed with ammonium hydroxide, water, and methanol and then dried under reduced pressure (0.02mm) at 110° C. An intrinsic viscosity of 2.1 dl/g was obtained in methanesulfonic acid.

EXAMPLE VII

Poly(benzo(1,2-d:4.5-d')bisimidazole-2.6-diyl(2-methyl-p-phenylene))

Into the bottom of a resin flask equipped with a high torque mechanical stirrer, nitrogen inlet/outlet, pressure regulator and a side opening for additions, was placed 2.6382 g (9.3 mmol) of 1,2,4,5-tetraminobenzene tetrahydrochloride, 1.6733 g (9.3 mmol) of 2-methyl-terephthalic acid and 6.0 g of PPA (77% $P_2O_5$). The monomers were incorporated into the PPA by stirring, resulting mixture was then dehydrochlorinated under reduced pressure (176 mm) by heating as follows: 45° C./18h; 78° C./8h; 80° C./16h. The reaction mixture was cooled to 50° C. and 5.3 g of $P_2O_5$ was added, thereby raising the final polymer concentration to 16%. Under a positive nitrogen flow, the mixture was heated at 170° C. for 20h, then at 190° C. for 4h. As the temperature was increased, opalescence began to appear at about 160° C. The polymer was precipitated into water, collected by suction filtration, washed with ammonium hydroxide, water, and methanol and then dried under reduced pressure (0.02mm) at 110° C. An intrinsic viscosity of 6.1 dl/g was obtained in methanesulfonic acid.

Calcd for $C_{15}H_{10}N_4$: C, 73.16: H, 4.09; N, 22.75
Found: C, 71.69: H, 4.58; N, 18.81

EXAMPLE VIII

Solubility and Crosslinking with Heat

The polymers prepared according to Examples I–VII were found to be soluble in sulfuric acid at room temperature. The polymers exhibited no solubility in aprotic solvents. The mono-methyl pendant polymers exhibited greater solubility in sulfuric acid than the analogous dimethyl polymer system. Concentrated solutions, up to 15%, were obtained with the polymer prepared in Example I. This polymer exhibited liquid crystalline behavior.

The polymers were spun into fibers and these fibers were crosslinked by exposure to heat. In a nitrogen atmosphere, after exposure of the fiber samples to 500°–550° C. for about 30–40 sec, they were insoluble in all acid solvents. In an air atmosphere, after exposure of the fiber samples to 300°–350° C. for about 30–40 sec, they were insoluble in all acid solvents.

EXAMPLE IX

Radiation Crosslinking

Fibers spun from the polymer prepared in Example I were crosslinked by exposure to Gamma radiation (bulk dosage 2 MRad/hr). The fibers which received totals of 100 and 200 Rad were soluble in methanesulfonic acid. Fibers receiving 1 GRad swelled slightly after 24 hours in methanesulfonic acid. The mechanical properties of the fibers which received 1 GRad are as follows:

| Modulus (msi) | 15.9 ± 1.5 |
| Tensile strength (ksi) | 160 ± 40 |
| Elongation to break (%) | 1.1 ± 0.2 |
| Compressive strength (ksi) | 106 |

Various modifications may be made to the invention as described without departing from the spirit of the invention or the scope of the appended claims.

We claim:

1. A para-ordered aromatic heterocyclic polymer having repeating groups of the formula

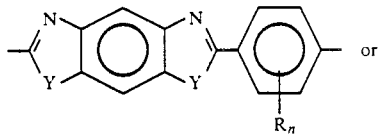

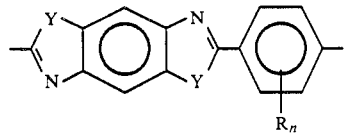

wherein Y is —S—, n is 1 or 2, and R is an alkyl group having 1 to 4 carbon atoms.

2. The polymer of claim 1 wherein n is 1.
3. The polymer of claim 2 wherein R is —CH$_3$.
4. The polymer of claim 1 wherein n is 2.
5. The polymer of claim 4 wherein R is —CH$_3$ and —CH$_3$.

* * * * *

UNITED STATES PATENT AND TRADEMARK OFFICE
CERTIFICATE OF CORRECTION

PATENT NO. : 5,001,217

DATED : March 19, 1991

INVENTOR(S) : Tsu-Tzu Tsai et al

It is certified that error appears in the above-identified patent and that said Letters Patent is hereby corrected as shown below:

```
Column 2, line 61, after "temperature", insert -- , e.g., --.
Column 3, line 20, correct the spelling of "birefringent".
Column 4, line 46, after "(11 mmol)", delete ", or" and insert -- of --.
Column 4, line 66, "C, 65.26:" should read -- C, 64.26: --.
Column 5, line 2, "-2.6-diyl(2" should read -- -2,6-diyl(2, --.
Column 5, line 33, "-2.6-diyl(2.5-" should read -- -2,6-diyl(2,5- --.
Column 5, line 42, "-2.6-diyl" should read -- -2,6-diyl --.
Column 6, line 4, "10.I dl/g" should read -- 10.1 dl/g --.
Column 6, line 17, "(11 mmol) or" should read -- (11 mmol) of --.
Column 6, line 36, "-d:4.5-d')bisimidazole-2.6-diyl" should read
     -- -d:4,5-d')bisimidazole-2,6-diyl --.
```

Signed and Sealed this

Twelfth Day of January, 1993

Attest:

DOUGLAS B. COMER

*Attesting Officer*                    *Acting Commissioner of Patents and Trademarks*